Nov. 9, 1937.   C. W. VAN RANST   2,098,265
MOTOR VEHICLE
Filed March 21, 1932   4 Sheets-Sheet 1

Inventor
Cornelius W. VanRanst
By Watson, Coit, Morse & Grindle
Attorneys

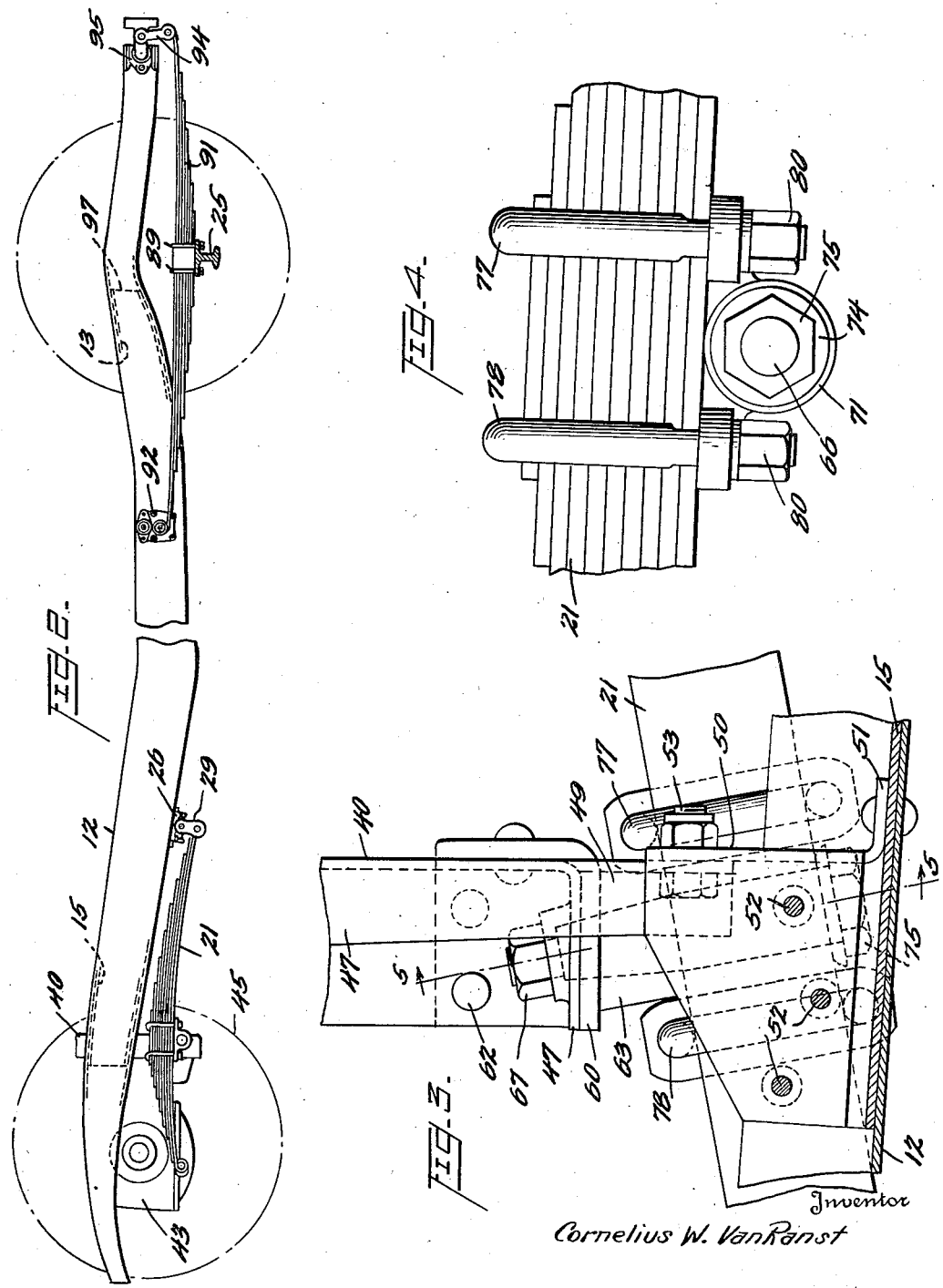

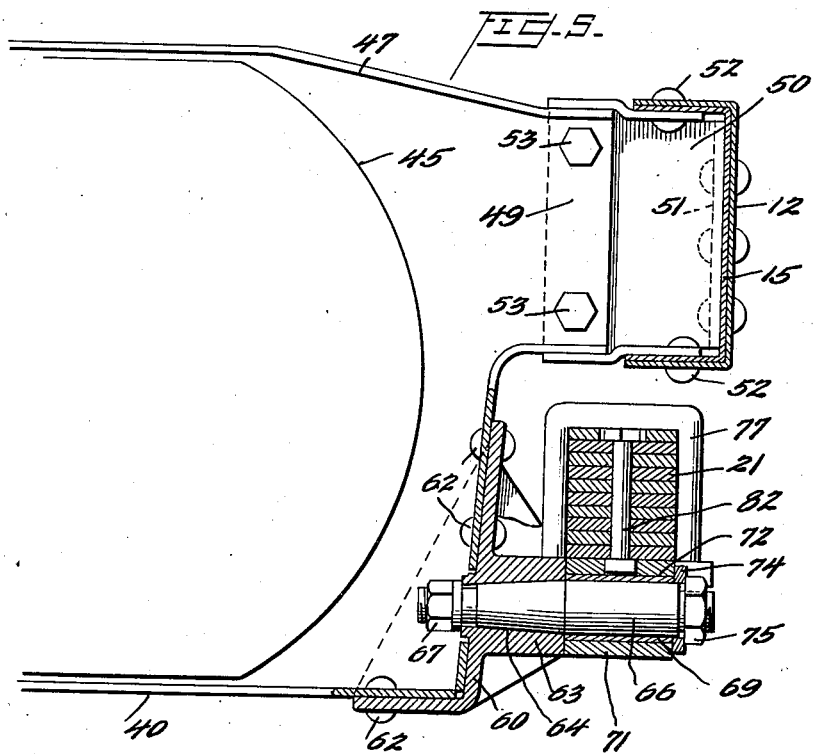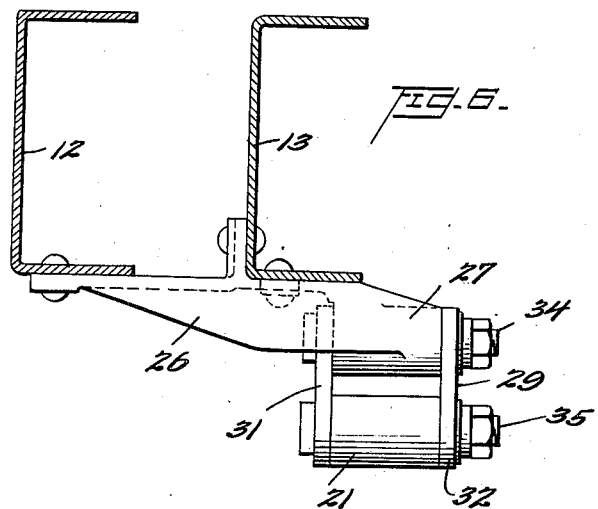

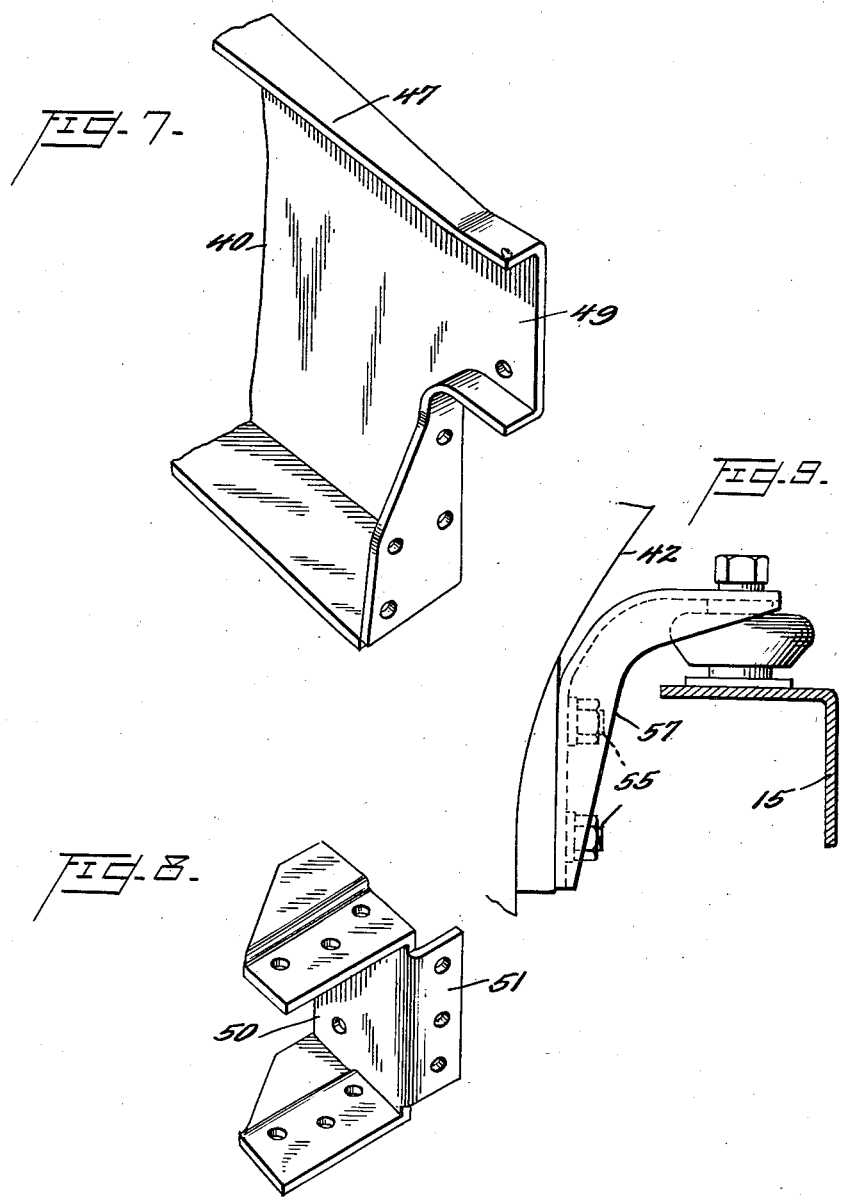

Patented Nov. 9, 1937

2,098,265

UNITED STATES PATENT OFFICE 2,098,265

MOTOR VEHICLE

Cornelius W. Van Ranst, Detroit, Mich., assignor to Packard Motor Car Company, Detroit, Mich., a corporation of Michigan Application March 21, 1932, Serial No. 600,345

26 Claims. (Cl. 180—64)

This invention relates to motor vehicles and more particularly to a novel vehicle body frame construction and motor mounting. It is the principal object of the invention to provide a frame suitable for use with vehicles in which the motive power is transmitted to the front wheels, the motor being located at the forward end of the vehicle as is conventional practice in vehicles employing a rear wheel drive, although it will be appreciated that various features of the invention are equally applicable to vehicles of other types.

It is a feature of the invention to provide a vehicle frame construction both light and sturdy and having sufficient rigidity to resist distorting forces when the vehicle is subjected to the most severe driving conditions.

A more specific object of the invention is the provision of a vehicle frame comprising longitudinally extending side frame members and reinforcing cross frame members, the latter connecting the forward end of one side frame member with the rearward end of the opposite side frame member and extending nearly the entire length of the vehicle frame from points adjacent the front axle to points adjacent the rear axle.

A further object of the invention is the provision, in the type of body frame described, of cantilever vehicle springs for supporting the frame on the front axle in such manner as to ensure maximum strength, and a motor supporting means directly connected with the frame and with the vehicle springs.

Further objects and features of the invention will be apparent from the following description taken in connection with the accompanying drawings, in which:

Figure 2 is a side elevation of the construction shown in Figure 1;

Figure 3 is a fragmentary detailed sectional view illustrating the motor support and forward spring support;

Figure 4 is an elevation of the spring support shown in Figure 3;

Figure 5 is a sectional view on the line 5—5 of Figure 3;

Figure 6 is a sectional view on the line 6—6 of Figure 1;

Figures 7 and 8 are perspective views of cooperating parts of the motor supporting means; and Figure 9 is a fragmentary sectional view on the line 9—9 of Figure 1.

Figure 1:
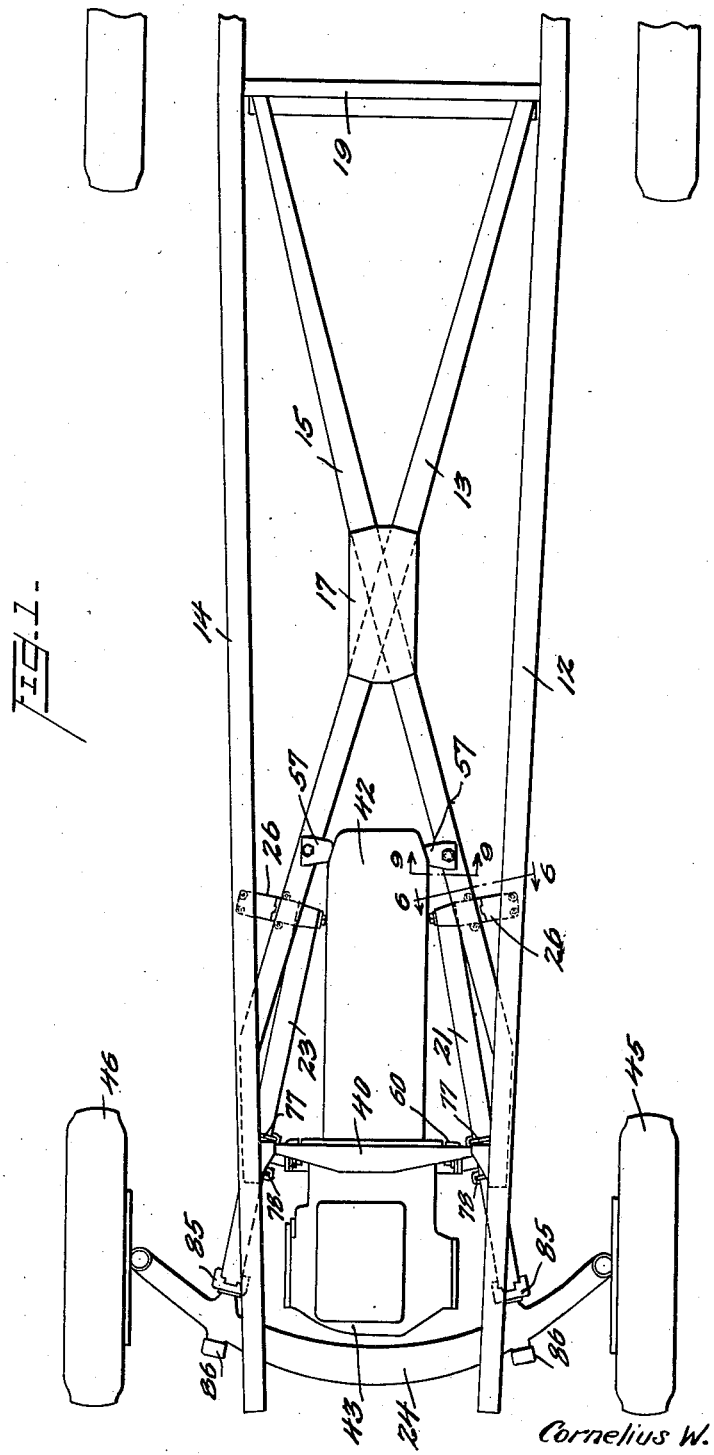
Figure 1 is a plan view of a vehicle chassis constructed in accordance with the principles of the invention.

To facilitate an understanding of the invention a preferred embodiment thereof is shown in the drawings and described in detail hereinafter. It will nevertheless be appreciated that no limitation of the invention is intended by the use of specific language in describing the same and that such variations and alterations are contemplated as fall within the principles underlying the invention.

Referring specifically to the drawings, it will be observed that the chassis comprises an elongated substantially rectangular body frame defined by the side frame members 12 and 14, these members being preferably of channel shape in cross-section as shown in Figure 6 of the drawings. Cross frame members 13 and 15 are each connected at their opposite ends with opposite side frame members adjacent the forward and rearward ends of the latter or, otherwise stated, at points adjacent the front axle 24 and the rear axle 25, these cross frame members preferably intersecting at the longitudinal center of the vehicle. Any convenient construction may be adopted at the point of intersection of the cross frame members; for instance, each member may be slit to a point midway of its depth to receive the other member in interlocking relation, plates 17 being provided above and below the members and riveted or otherwise secured thereto to strengthen the construction.

The manner in which the cross frame members are connected to the side frame members adjacent the rear ends of the latter is not an essential feature of the invention. Connection may be effected by bolting or riveting the corresponding members directly together, or, as shown in Figure 1 of the drawings, a transversely extending member 19 may be provided to which the cross frame members 13 and 15 are secured at points adjacent the associated side frame members 12 and 14.

The cross frame members merge with corresponding side frame members at a point spaced to a considerable extent from the forward ends of the former and are bent into alignment with the side frame members so that an appreciable portion of the cross frame and side frame members may be in engagement and preferably in interfitting relation. For example, the cross frame members may be formed of smaller channel sections than the side frame members to seat therein as shown in Figure 5 of the drawings.

It will be observed from the construction thus far described that both the cross frame and side frame members extend to points adjacent the extreme forward and rearward ends of the vehicle, an exceedingly sturdy construction and one highly resistant to weaving being thus afforded. As hereinbefore suggested, the ends of the vehicle may be most conveniently defined with reference to the front and rear axles since in special frame constructions it is sometimes preferable to provide an elongated body frame of which a considerable portion extends beyond either axle and is not included in the body frame proper.

Forward vehicle springs 21 and 23, preferably of the leaf type, support the body frame thus far described on the axle 24, a cantilever construction being preferably employed. For this purpose each spring is secured to or supported by the body frame at two points, and at each point of support a connection is afforded between the spring and both the cross frame and side frame members. Each rear support preferably includes a bracket or brace member 26 which is bolted or otherwise secured to associated cross frame and side frame members adjacent to but rearwardly of the point at which these members merge as shown in Figure 1 of the drawings and more specifically in Figure 6. An integral portion 27 of each brace member 26 serves to support a conventional spring shackle 29 in which the corresponding spring 21 or 23 is mounted in the usual manner to permit slight forward and rearward movement of the rear end of the spring. For instance, each shackle may comprise the side plates 31 and 32 apertured to receive the bolts 34 and 35, the bolt 34 being carried in the portion 27 of the brace member 26 and the bolt 35 serving to directly engage and support the rear end of the spring.

The forward support for each spring is located beneath and adjacent the engaged and directly secured portions of the corresponding cross frame and side frame members and is connected to these frame members by means which serves as a support for the motor and transmission. As hereinbefore pointed out, the invention is particularly applicable to motor vehicles employing a front wheel drive in which a greater spring weight is located at the forward end of the vehicle and it is thus of advantage to provide a construction in which at least a portion of the weight of the motor and transmission will be transferred directly to the vehicle springs rather than through the body frame members.

For this purpose a motor supporting plate 40 may be provided, this plate extending transversely of the body frame and being positioned intermediate the motor of which the outline of the motor block and crankcase is indicated at 42, and the transmission housing 43 and preferably clamped or bolted therebetween. The transmission housing serves to enclose the vehicle clutch and change speed and differential gearing, the driving connections between the gearing and the front wheels 45 and 46 of the vehicle which are supported on the axle 24 being omitted for the sake of clearness.

As best shown in Figure 5 of the drawings, the motor supporting plate 40 is provided with an opening 45 substantially conforming to the communicating openings between the crankcase and transmission housing and is positioned therebetween, the plate 40, crankcase and the transmission housing being securely bolted together in any convenient manner. An inwardly directed flange 47 formed integrally with the plate 40 affords additional strength and facilitates the securing of the plate to the frame members, the flange 47 and the plate 40 being pressed out on either side to form laterally extending neck portions 49 substantially U-shaped in cross-section fitting within and embraced by members 50 and bolted thereto. The members 50 are likewise substantially U-shaped in cross-section and are secured to the upper and lower flanges of the channel frame members by means of bolts 52, the members 50 fitting snugly within the inner or cross frame member. Bolts 53 may be provided to secure the members 40 and 50 rigidly together.

It will be observed that in this manner the entire frame is rigidly reinforced and is highly resistant to torsional and longitudinal stresses. The members 13 and 15 form an X frame structure secured to and extending between the side frame members at a point spaced substantially to the rear of the transversely extending member 40, the side frame members being reinforced intermediate the X frame structure and the member 40 by the forward portions of the members 13 and 15 which are at this point coextensive with the side frame members.

Figures 7 and 8 of the drawings illustrate clearly the manner in which the laterally extending neck portions 49 are formed on each side of the motor supporting plate 40 and the manner in which these necks are received in the members 50, each of the latter being provided with a reversely bent flange portion 51 which extends parallel with and is bolted to the side faces of the side frame members and cross frame members.

It is desirable to provide additional support for the rear end of the motor and, as shown in the drawings, this may comprise brackets 57 secured to each side of the crankcase by means of bolts 55, each bracket being substantially L-shaped as shown more particularly in Figure 9 of the drawings, the upper limb of the bracket extending over the adjacent cross frame member 13 or 15. In order to deaden shock and reduce vibration, a resilient cushion, preferably of rubber, is interposed between the upper limb of the bracket and the cross frame member and is bolted to both.

A bracket member 60 is secured to each side of the plate 40 and is constructed as shown in Figure 5 of the drawings to engage the main portion of the plate and two faces of the flange 47 and is secured to the latter by means of bolts 62. Each bracket 60 is provided with a boss 63 having an aperture 64 therethrough through which is passed the tapered shank of a pin 66, the pin extending completely through the bracket and being secured in position by means of a nut 67 threaded on the inner end thereof. A bushing 69 surrounds the outer portion of the pin and a member 71 having an aperture 72 therein is received on the bushing, the bushing and member 72 being retained in position against lateral displacement on the pin 66 by means of a washer 74 and a nut 75 threaded on the outer end of the pin.

The forward spring 21 or 23 is preferably secured to the member 71 by means of U bolts 77 and 78 passing around the spring and through apertures in the member 71, these bolts being clamped in position by means of nuts 80. If desired a bolt 82 passing through the spring leaves may be provided to retain the leaves in position during assembly.

It will be observed from the foregoing description that each forward spring is pivotally supported intermediate its ends on a spring perch carried by the motor supporting plate 40, the plate being in turn secured to the frame members, so that a portion of the load of the motor and transmission gearing is taken directly by the spring. It will further be observed that the cross frame members extend forwardly of the forward spring supports.

The extreme forward ends of the forward springs are carried in conventional spring shackles 85, these spring shackles being swivelled on the axle 24 about axes extending generally in the direction of the spring and the fore and aft direction of the vehicle. If desired, this result may be accomplished by supporting the spring hangers 85 on spindles 86 extending through and journalled in the axle 24, the axes of these spindles being substantially in line with the forward ends of the springs. Thus inequalities in the road bed which may result in the elevation of one of the front wheels only and flattening of the spring associated therewith will exert no twisting force on the spring which might tend to break or distort the same.

The preferred method of supporting the rear end of the body frame on the rear wheels is shown in Figure 2 of the drawing in which the rear axle 25 is secured by conventional U-bolts 89 to each rear spring 91 adjacent the central portion of the latter. The forward end of each spring is carried in a spring hanger 92 secured to the outer face of the adjacent side frame member while the rear end of each spring is connected through a spring shackle 94 to a bracket 95 secured to the side frame member at the extreme rear end of the latter. The rear end of the cross frame member is indicated in dotted lines at 97 in order to show the relative position of the wheel and cross frame member.

It will be observed that by reason of the disposition of the motor and the gearing at the forward portion of the vehicle the frame members may be curved downwardly toward the rear of the vehicle so that the vehicle body may be lowered to a considerable extent, the construction nevertheless affording ample road clearance.

Having thus described the invention, what is claimed as new and desired to be secured by Letters Patent is:

1. In a motor vehicle, the combination with a motor crankcase, a transmission housing adjacent said crankcase, a supporting member positioned intermediate said crankcase and housing and secured thereto, a vehicle body frame comprising a pair of longitudinally extending side frame members, cross frame members connecting said side frame members, each cross frame member extending from a point adjacent the forward end of one side frame member to a point adjacent the rearward end of the other side frame member, said side frame members and cross frame members extending forwardly of said supporting member and being secured thereto.

2. In a motor vehicle, the combination with a motor crankcase, a transmission housing adjacent said crankcase, a supporting member positioned intermediate said crankcase and housing and secured thereto, a vehicle body frame comprising a pair of longitudinally extending side frame members, cross frame members connecting said side frame members, each cross frame member extending from a point adjacent the forward end of one side frame member to a point adjacent the rearward end of the other side frame member, said side frame members and cross frame members merging and being secured together adjacent said supporting member, and means for connecting said supporting member to the merged and secured portions of said frame members.

3. In a motor vehicle, the combination with a motor crankcase, a transmission housing adjacent said crankcase, a supporting member positioned intermediate said crankcase and housing and secured thereto, a vehicle body frame comprising a pair of longitudinally extending side frame members, cross frame members connecting said side frame members, each cross frame member extending from a point adjacent the forward end of one side frame member to a point adjacent the rearward end of the other side frame member, said side frame members and cross frame members merging and being secured together adjacent said supporting member, means for connecting said supporting member to the merged and secured portions of said frame members, and vehicle spring supporting means carried by said supporting member at either side of said housing and crankcase.

4. In a motor vehicle, the combination with a motor crankcase, a transmission housing adjacent said crankcase, a supporting member positioned intermediate said crankcase and housing and secured thereto, a vehicle body frame comprising a pair of longitudinally extending side frame members, cross frame members connecting said side frame members, each cross frame member extending from a point adjacent the forward end of one side frame member to a point adjacent the rearward end of the other side frame member, said side frame members and cross frame members merging and being secured together adjacent said supporting member, means for connecting said supporting member to the merged and secured portions of said frame members, vehicle spring supporting means carried by said supporting member at either side of said housing and crankcase, and brace members connecting each cross frame member and the associated side frame member adjacent to and rearwardly of the point of merging of the frame members.

5. In a motor vehicle, the combination with a motor crankcase, a transmission housing adjacent said crankcase, a supporting member positioned intermediate said crankcase and housing and secured thereto, a vehicle body frame comprising a pair of longitudinally extending side frame members, cross frame members connecting said side frame members, each cross frame member extending from a point adjacent the forward end of one side frame member to a point adjacent the rearward end of the other side frame member, said side frame members and cross frame members merging and being secured together adjacent said supporting member, means for connecting said supporting member to the merged and secured portions of said frame members, vehicle spring supporting means carried by said supporting member at either side of said housing and crankcase, brace members connecting each cross frame member and the associated side frame member adjacent to and rearwardly of the point of merging of the frame members, and vehicle spring supporting means carried by said brace members.

6. In a motor vehicle body frame, the combination with a pair of longitudinally extending side frame members, cross frame members connecting said side frame members, each cross frame member extending from a point adjacent the forward end of one side frame member to a point adjacent the rearward end of the other side frame member, brace members extending between each cross frame member and one of said side frame members, and vehicle spring supporting means associated with each brace member.

7. In a motor vehicle body frame, the combination with a pair of longitudinally extending side frame members, cross frame members connecting said side frame members, each cross frame member being directly connected to one of said side frame members adjacent the forward end of the latter and extending to a point adjacent the rearward end of the other side frame member, brace members extending between each cross frame member and one of said side frame members, each brace member being located adjacent to and rearwardly of the point of direct connection between the corresponding side frame member and cross frame member, and vehicle spring supporting means associated with each brace member.

8. In a motor vehicle, the combination with an axle, of a body frame supported on said axle, of said body frame comprising a pair of longitudinally extending side frame members, cross frame members connecting said side frame members, each cross frame member extending from a point adjacent the forward end of one side frame member to a point adjacent the rearward end of the other side frame member, brace members extending between each cross frame member and one of said side frame members, and cantilever vehicle springs secured to said brace members and connected with said axle.

9. In a motor vehicle, the combination with an axle, of a body frame comprising a pair of longitudinally extending side frame members, cross frame members connecting said side frame members, each cross frame member extending from a point adjacent the forward end of one side frame member to a point adjacent the rearward end of the other side frame member, brace members extending between each cross frame member and one of said side frame members, vehicle spring supporting means associated with each brace member, and cantilever vehicle springs connected with said axle and said vehicle spring supporting means.

10. In a motor vehicle, the combination with an axle, of a body frame comprising a pair of longitudinally extending side frame members, members forming an X frame structure connecting said side frame members, brace members extending between each member of the X frame structure and one of said side frame members, vehicle spring supporting means associated with each brace member, and cantilever vehicle springs connected with said axle and said vehicle spring supporting means, each of said springs being secured to the body frame intermediate the points of connection with the axle and the spring supporting means.

11. In a motor vehicle, the combination with an axle, of a body frame comprising a pair of longitudinally extending side frame members, cross frame members connecting said side frame members, each cross frame member extending from a point adjacent the forward end of one side frame member to a point adjacent the rearward end of the other side frame member, brace members extending between each cross frame member and one of said side frame members, vehicle spring supporting means associated with each brace member, and cantilever vehicle springs connected with said axle and said vehicle spring supporting means, each of said springs being secured to the associated side frame member intermediate the points of connection with the axle and the spring supporting means.

12. In a vehicle frame, the combination with longitudinally extending side frame members, of members forming an X frame structure connecting said side frame members, means extending between and secured to each of said side frame members and one of said second named members, and a vehicle spring hanger carried by said means.

13. In a motor vehicle, the combination with an axle, of a body frame supported on said axle, said body frame comprising a pair of longitudinally extending side frame members, members forming an X frame structure connecting said side frame members, brace members extending between each of said last named members and one of said side frame members, and cantilever vehicle springs secured to said brace members and connected with said axle, the connection between said axle and said springs being such as to permit relative rotational movement of said axle and springs about axes extending generally in the direction of the length of the vehicle.

14. In a motor vehicle, the combination with an axle, of a body frame supported on said axle, said body frame comprising a pair of longitudinally extending side frame members, members forming an X frame structure connecting said side frame members, brace members extending between each of said last named members and one of said side frame members, and cantilever vehicle springs extending substantially longitudinally of the vehicle, said springs being secured to said brace members and connected with said axle, the connection between said axle and vehicle springs including spring hangers for the forward ends of the springs, said spring hangers being swivelled in the axle for rotative movement with respect thereto about axes extending generally in a direction fore and aft of the vehicle.

15. In a motor vehicle, the combination with a pair of longitudinally extending side frame members, cross frame members connecting said side frame members, each cross frame member extending from a point adjacent the forward end of one side frame member to a point adjacent the rearward end of the other side frame member, motor supporting means extending transversely of the vehicle and carried by said side frame members, cantilever vehicle springs, and supports for said springs carried by said motor supporting means and said cross frame members.

16. In a motor vehicle body frame, the combination with a pair of longitudinally extending side frame members, cross frame members connecting said side frame members, each cross frame member extending from a point adjacent the forward end of one side frame member to a point adjacent the rearward end of the other side frame member, brace members extending between each cross frame member and one of said side frame members, vehicle spring supporting means associated with each brace member, motor supporting means extending transversely of the vehicle and connecting said side frame members, and vehicle spring supporting means carried by said motor supporting means.

17. In a motor vehicle body frame, the combination with a pair of longitudinally extending side frame members, members forming an X frame structure connecting said side frame members, brace members extending between each of said second named members and one of said side frame members, vehicle spring supporting means associated with each brace member, motor supporting means extending transversely of the vehicle and connecting said side frame members, said motor supporting means being located forwardly of said brace members, vehicle spring supporting means carried by said motor supporting means, and a pair of vehicle springs extending generally fore and aft of the vehicle, each of said springs being connected with each of said spring supporting means.

18. In a motor vehicle, the combination with a motor crankcase, a transmission housing adjacent said crankcase, a supporting member positioned intermediate said crankcase and housing and secured thereto, a vehicle body frame comprising a pair of longitudinally extending side frame members, members forming an X frame structure connecting said side frame members, said side frame members and the members of said X frame structure extending forwardly of said supporting member and being secured thereto.

19. In a motor vehicle, the combination with a motor crankcase, a transmission housing adjacent said crankcase, a supporting member posicent said crankcase, a supporting member positioned intermediate said crank case and housing and secured thereto, a vehicle body frame comprising a pair of longitudinally extending side frame members, members forming an X frame structure connecting said side frame members, said side frame members and the members of said X frame structure merging and being secured together adjacent said supporting member, and means for connecting said supporting member to the merged and secured portions of said side frame members and the members of said X frame structure.

20. In a motor vehicle, the combination with a motor crankcase, a transmission housing adjacent said crankcase, a supporting member positioned intermediate said crankcase and housing and secured thereto, a vehicle body frame comprising a pair of longitudinally extending side frame members, members forming an X frame structure connecting said side frame members, said side frame members and the members of said X frame structure merging and being secured together adjacent said supporting member, means for connecting said supporting member to the merged and secured portions of said side frame members and the members of said X frame structure, and vehicle spring supporting means carried by said supporting member at either side of said housing and crankcase.

21. In a motor vehicle, the combination with a motor crankcase, a transmission housing adjacent said crankcase, a supporting member positioned intermediate said crankcase and housing and secured thereto, a vehicle body frame comprising a pair of longitudinally extending side frame members, members forming an X frame structure connecting said side frame members, said side frame members and the members of said X frame structure merging and being secured together adjacent said supporting member, means for connecting said supporting member to the merged and secured portions of said side frame members and the members of said X frame structure, vehicle spring supporting means carried by said supporting member at either side of said housing and crankcase, and brace members connecting the members of said X frame structure and the associated side frame members adjacent to and rearwardly of the point of merging thereof.

22. In a motor vehicle, the combination with a motor crankcase, a transmission housing adjacent said crankcase, a supporting member positioned intermediate said crankcase and housing and secured thereto, a vehicle body frame comprising a pair of longitudinally extending side frame members, members forming an X frame structure connecting said side frame members, said side frame members and the members of said X frame structure merging and being secured together adjacent said supporting member, means for connecting said supporting member to the merged and secured portions of said side frame members and the members of said X frame structure, vehicle spring supporting means carried by said supporting member at either side of said housing and crankcase, brace members connecting the members of said X frame structure and the associated side frame members adjacent to and rearwardly of the point of merging thereof, and vehicle spring supporting means carried by said brace members.

23. In a motor vehicle body frame, the combination with a pair of longitudinally extending side frame members, members forming an X frame structure connecting said side frame members, brace members extending between each member of the X frame structure and one of said side frame members, and vehicle spring supporting means associated with each brace member.

24. In a motor vehicle, the combination with a pair of longitudinally extending side frame members, members forming an X frame structure connecting said side frame members, motor supporting means extending transversely of the vehicle and carried by said side frame members, vehicle cantilever vehicle springs, and supports for said springs carried by said motor supporting means and the members of said X frame structure.

25. In a motor vehicle body frame, the combination with a pair of longitudinally extending side frame members, members forming an X frame structure connecting said side frame members, brace members extending between each of said second named members and one of said side frame members, vehicle spring supporting means associated with each brace member, motor supporting means extending transversely of the vehicle and connecting said side frame members, and vehicle spring supporting means carried by said motor supporting means.

26. In a motor vehicle, the combination with a pair of longitudinally extending side frame members, of a transversely extending member secured rigidly to said side frame members near the forward ends of the latter, members secured to said side frame members and forming an X frame structure therebetween at a substantial distance to the rear of said transversely extending member, said last named members having forwardly directed portions coextensive with and secured to the associated side frame members and having the forward ends thereof secured to said transversely extending member.

CORNELIUS W. VAN RANST.